(12) United States Patent
Shijo et al.

(10) Patent No.: US 8,169,363 B2
(45) Date of Patent: May 1, 2012

(54) ANTENNA DEVICE AND RADAR APPARATUS

(75) Inventors: Tetsu Shijo, Tokyo (JP); Shuichi Obayashi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 235 days.

(21) Appl. No.: 12/718,302

(22) Filed: Mar. 5, 2010

(65) Prior Publication Data

US 2010/0231440 A1  Sep. 16, 2010

(30) Foreign Application Priority Data

Mar. 10, 2009  (JP) ................................. 2009-056259

(51) Int. Cl.
*G01S 7/28* (2006.01)
(52) U.S. Cl. ......... 342/175; 342/157; 342/158; 342/371
(58) Field of Classification Search .................. 342/175, 342/81, 157, 158, 368–374; 343/700 MS
See application file for complete search history.

(56) References Cited

U.S. PATENT DOCUMENTS

| | | | |
|---|---|---|---|
| 5,079,557 A * | 1/1992 | Hopwood et al. | 342/373 |
| 5,218,358 A * | 6/1993 | Harrington et al. | 342/372 |
| 5,302,959 A * | 4/1994 | Harrington et al. | 342/372 |
| 2006/0152414 A1* | 7/2006 | Peshlov et al. | 343/700 MS |
| 2009/0079648 A1* | 3/2009 | Matsuo et al. | 343/771 |
| 2010/0123619 A1* | 5/2010 | Shijo et al. | 342/175 |
| 2010/0225528 A1* | 9/2010 | Shijo et al. | 342/157 |
| 2010/0231440 A1* | 9/2010 | Shijo et al. | 342/195 |

FOREIGN PATENT DOCUMENTS

JP  3843946  8/2006

* cited by examiner

*Primary Examiner* — John B Sotomayor
(74) *Attorney, Agent, or Firm* — Oblon, Spivak, McClelland, Maier & Neustadt, L.L.P.

(57) ABSTRACT

An antenna device includes an antenna substrate and a feed line substrate. The antenna substrate includes subarray antennas, feeding interfaces and a back surface. The subarray antennas are arranged parallel with an interval on a plane. Each subarray antenna includes antenna elements and first feed lines. The first feed lines feed signals from the feeding interface on back surface to the antenna elements. The feed line substrate is attached along back surface and includes second feed lines, first and second mode transformers. Each second feed line has one and other ends portions. Other end portion has wider width than one end portion. Each first mode transformer is located in one end portion and connected to the feeding interface. Each second mode transformer is located in other end portion. One end portions are arranged in a line with interval, and other end portions are alternately arranged across one end portions.

10 Claims, 12 Drawing Sheets

ANTENNA DEVICE AND RADAR APPARATUS

CROSS REFERENCE TO RELATED APPLICATIONS

This application is based upon and claims the benefit of priority from the Japanese Patent Application No. 2009-056259, filed on Mar. 10, 2009, the entire contents of which are incorporated herein by reference.

BACKGROUND OF THE INVENTION

1. Field of the Invention

The present invention relates to an antenna device and a radar apparatus.

2. Description of the Related Art

In radar systems, an array antenna forms a beam to transmit a signal. Then, the array antenna receives an echo signal which is corresponded to the signal in order to measure a target angle. The array antenna includes several subarray antennas and feeding interfaces. Each subarray antenna includes antenna elements and feed lines. The feed lines feed signals to the antenna elements. The antenna element may be any one of a patch, horn, slot antenna. The feed line may be any one of a microstrip line, a triplate line, a waveguide, a dielectric waveguide, and a post-wall waveguide. A waveguide feeding is popular for the antenna in automotive radar systems using the millimeter wave.

One of the waveguide feedings is disclosed in Japanese Patent No. 3843946. In this reference, several waveguide are formed by piling two metal walls. These waveguide provide a choke structure in order to avoid coupling of high frequency signals current in the waveguides.

In the automotive radar systems, interval between the adjacent subarray antennas should be narrow in order to achieve a wide coverage angle. For example, the interval between the adjacent subarray antennas is better to be equal to or smaller than $0.6\lambda$, where $\lambda$ is a free-space wavelength, in order to achieve the coverage angle of 40-degree.

However, in the case of waveguide feeding, it is difficult to achieve the narrow interval between the adjacent subarray antennas, when all feeding interfaces are formed at the same side of all subarray antennas. Moreover, extra space is required between adjacent subarray antennas in order to keep high isolation between the feeding interfaces.

As a result, the interval between the adjacent subarray antennas becomes wider and size of the antenna device becomes larger.

SUMMARY OF THE INVENTION

According to one aspect of the invention, an antenna device includes
an antenna substrate including
subarray antennas arranged parallel to each other with an interval the interval being less or equal than a free-space wavelength, each subarray antenna including antenna elements and first feed lines, the first feed lines feeding signals to the antenna elements,
an back surface of the antenna substrate including feeding interfaces, each feeding the signals to each of the first feed lines; and
a feed line substrate attached along the back surface, the feed line substrate including
second feed lines, each having one end portion and other end portion, the other end portion having wider line width than the one end portion, the one end portions are arranged in a line to each other with the interval, and the other end portions are alternately arranged across the one end portions,
first mode transformers, each being located in the one end portion, each being connected to each of the feeding interfaces each feeding signals from second feed lines to first feed lines, and
second mode transformers, each being located in the other end portion.

According to other aspect of the invention, a radar apparatus includes
the antenna device of claim 1, which receives a first signal;
an RF module amplifying the first signal and down-converting a frequency of the first signal to a lower frequency to obtain a second signal;
an A/D converter converting the second signal to a digital signal;
a DBF circuit measuring a target angle based on the digital signal.

DETAILED DESCRIPTION OF THE INVENTION

The embodiment will be explained with reference to the accompanying drawings.

Figure 1:
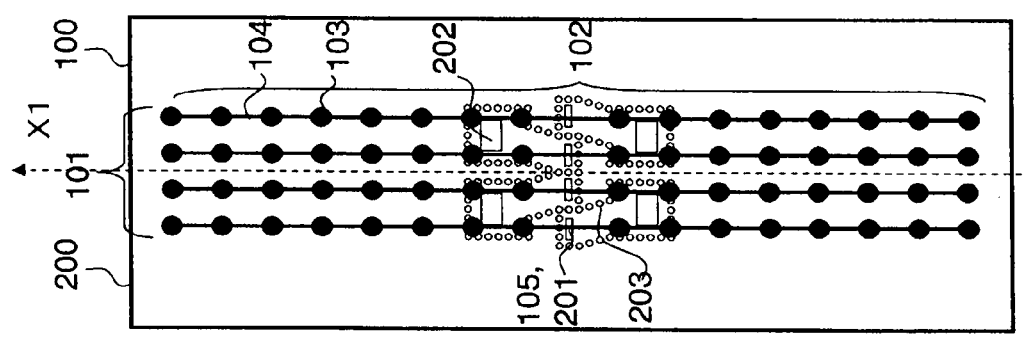
FIG. 1 is a top view of an antenna device.

As shown in FIG. 1, an antenna device includes an array antenna 101 and a feed line substrate 200. The array antenna 101 is formed on an antenna substrate 100. The antenna substrate 100 is piled on the feed line substrate 200.

Figure 2A:
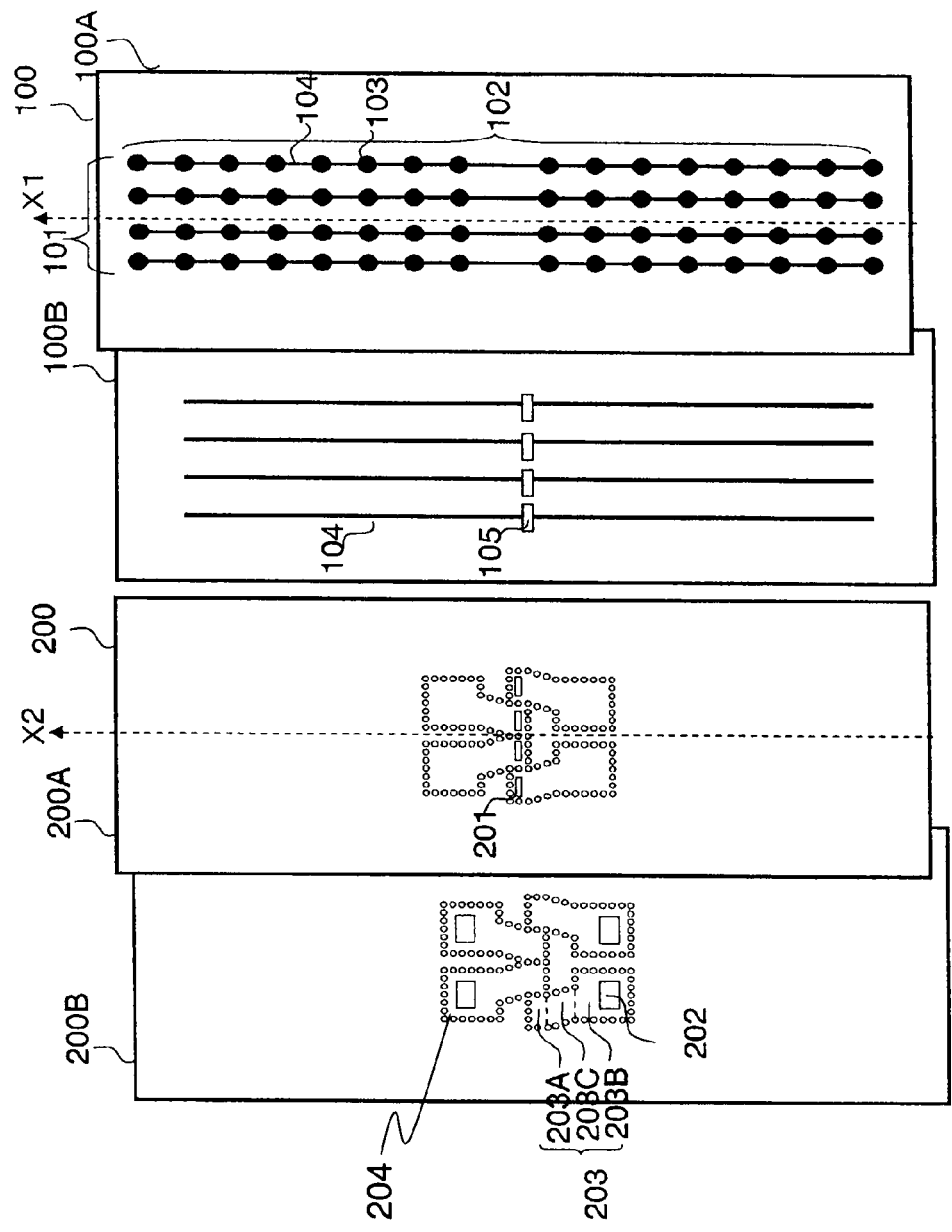
FIG. 2A is an exploded view of an antenna device.
Figure 2B:
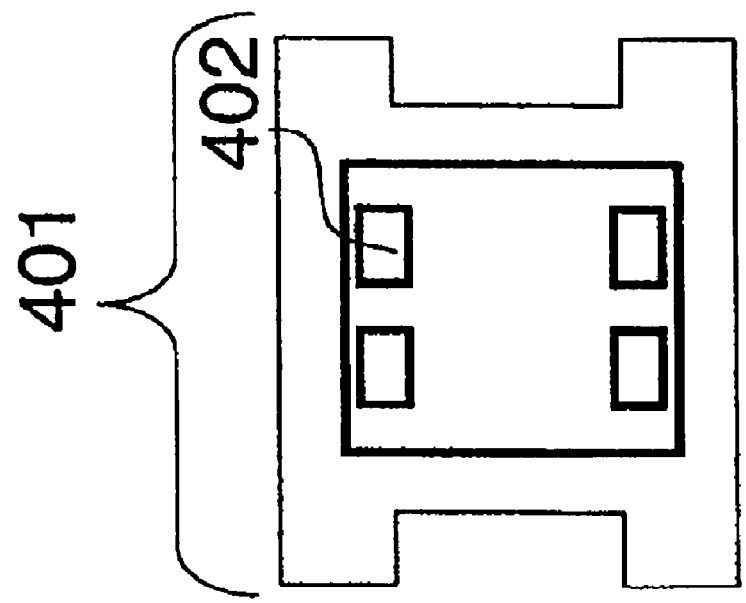
FIG. 2B is a top view of an RF module.

FIG. 2A is an exploded view of the antenna device. The antenna substrate 100 is shown as a top surface 100A and a back surface 100B. The feed line substrate 200 is shown as a top surface 200A and a back surface 200B. An RF module 401 shown in FIG. 2B is connected to the antenna device.

The antenna device and the RF module 401 provide a radar apparatus.

The array antenna 101 includes several subarray antennas 102. Each subarray antenna 102 includes antenna elements 103, first feed lines 104 and feeding interfaces 105.

The subarray antennas 102 are arranged along an alignment of the antenna elements 103 parallel to each other on a plane. The subarray antennas 102 provide the array antenna 101. The subarray antennas 102 are symmetrically arranged about a central axis X1 on the plane. When the number of the subarray antennas 102 is even, the central axis X1 is along with the center of two adjacent subarray antennas 102 arranged at middle of the subarray antennas 102. As shown in FIG. 1, the number of the subarray antennas 102 in one side of the central axis X1 is equal to the number of that in other side of the central axis X1.

The first feed lines 104 feeds signals to the antenna elements 103. The first feed lines 104 may be any one of a waveguide, a dielectric waveguide, a microstrip line, a triplate line, and a post-wall waveguide.

In the case that the first feed line 104 is any one of the waveguide, the dielectric waveguide and the post-wall waveguide, the antenna element 103 may be a slot or horn antenna element. In the case that the first feed line 104 is either of the microstrip line or the triplate line, the antenna element 103 may be a patch antenna element.

The feeding interface 105 is set on the first feed line 104 in the back surface 100B of the antenna substrate 100. The back surface 100B is reverse side of the top surface 100A on which the array elements 103 are formed. The feeding interface 105 electrically connects a second feed line 203 (described later) of the feed line substrate 200 with the first feed line 104. The second feed line 203 supplies signals of high frequency to the first feed line 104 through the feeding interface 105. The feed line substrate 200 is attached along the back surface 100B. The feeding interface 105 is connected to a first mode transformer 201 (described later).

Shape of the feeding interface 105 depends on the first feed line 104. Each feeding interface 105 exists in a center of each of the subarray antennas 102. The number of the antenna elements 103 in one side of the feeding interface 105 is equal to the number of that in other side of the feeding interface 105.

The distance of the between adjacent subarray antennas 102 (hereinafter, "subarray interval "d"") is following the expression (1) in order to reduce a grating lobe level. In the expression (1), a free-space wavelength of operating frequency is "λ" and a maximum coverage angle is "θm".

$$\frac{d}{\lambda} < \frac{1}{(1+\sin|\theta_m|)} \quad (1)$$

According to the expression (1), the subarray interval "d" is smaller than the free-space wavelength of operating frequency. For example, the subarray interval "d" should be smaller than 0.6λ to achieve the coverage angle of 40 degrees. The subarray antennas 102 are arranged along alignment of the antenna elements 103 parallel to each other according to the expression (1).

The feed line substrate 200 includes first mode transformers 201, second mode transformers 202 and the second feed line 203.

The feed line substrate 200 is formed by a copper-clad laminate. Both top and under surfaces of the copper-clad laminate are covered by the metal foils. The feed line substrate 200 is piled under the antenna substrate 100 as that each feeding interface 105 is connected to each of the first mode transformers 201. Specifically, the top surface 200A of the feed line substrate 200 is attached to the back surface 100B of the antenna substrate 100.

The first mode transformer 201 includes an aperture opened in an one end portion 203A of the second feed line 203. The aperture in the first mode transformer 201 is formed in the top surface 200A of the feed line substrate 200.

Shape of the first mode transformer 201 depends on the second feed line 203. The first mode transformer 201 is connected to the feeding interface 105 and supplies signals from the second feed line 203 to the first feed line 104 through the feeding interface 105. Each first mode transformer 201 is set to be connected to each of the feeding interface 105.

The second mode transformer 202 includes an aperture opened in an other end portion 203B of the second feed line 203. The aperture in the second mode transformer 202 is formed in the back surface 200B of the feed line substrate 200.

Shape of the second mode transformer 202 depends on the line connecting the second mode transformer 202 and the RF module 401. Each second mode transformer 202 is connected to each of RF ports 402 of the RF module 401. The second mode transformer 202 supplies signals from the RF module to the second feed line 203.

Figure 3:
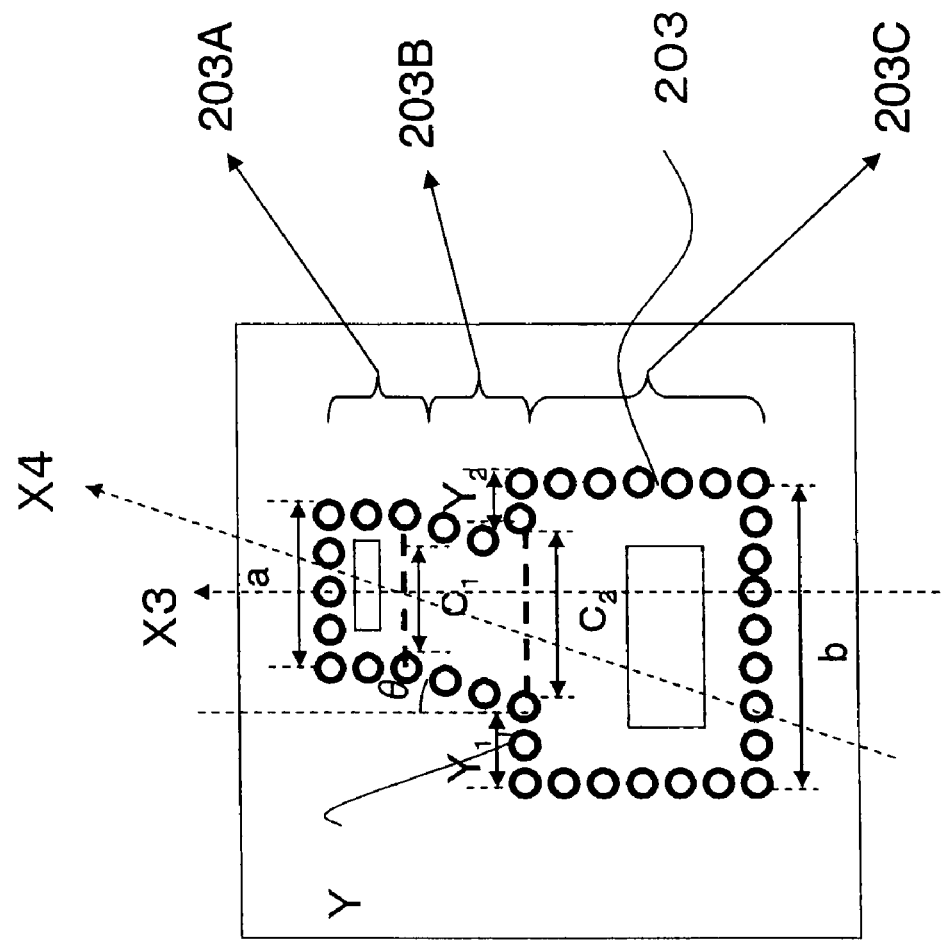
FIG. 3 is a top view of a second feed line.

As shown in FIG. 3, the first and second mode transformers 201, 202 are arranged being shifted against a central axis X3 to opposite directions respectively. Since the first and second mode transformers 201, 202 are set at staggered positions each other, they can feed to the subarray antennas 102 with small area. Moreover, the RF ports of the RF module can be arranged close to each other.

The second feed lines 203 are symmetrically arranged about a central axis X2. The second feed lines 203 are divided into two groups by the central axis X2. Both groups include same number of the second feed lines 203. The second feed line 203 connects the first mode transformer 201 with the second mode transformer 202.

Each second feed line 203 is surrounded by through holes 204 and the metal foil of the copper-clad laminate. Therefore, the second feed line 203 is a waveguide like structure. Each subarray antenna has each of the second feed lines 203. The one end portions 203A of the second feed lines 203 are arranged in a line with the subarray interval "d" as that the first mode transformer 201 is connected to the feeding interface 105. On the other hand, the other end portions 203B of the second feed lines 203 are alternately arranged across the one end portions 203A as that two other end portions 203B are not adjacent.

The second feed lines 203 are symmetrically arranged about the central axis X2. When the number of the subarray antennas 102 is even (that is the number of the second feed lines 203 is even), the other end portions 203B which are closest to the axis X2 are arranged adjacent.

The feeding interfaces 105 are better to be arranged with interval being equal to or smaller than 0.6λ in order to achieve that the subarray interval "d" is equal to or smaller than 0.6λ. We describe how to arrange the feeding interfaces 105 below.

The high frequency signals in the second feed lines can be traveled even though width of the second feed line is equal to or smaller than 0.6λ owing to effect of wavelength shortening in lines filled the dielectric. Moreover, since the second feed line 203 has waveguide like structure, it can keep high isolation regardless of interval of between adjacent second feed lines 203.

Therefore, since the adjacent second feed lines 203 can be arranged with short interval, the first mode transformer 201 can also be arranged with short interval being equal to or smaller than 0.6λ. As a result, the feeding interfaces 105 connected to the first mode transformer 201 can also be arranged with a interval being equal to or smaller than 0.6λ.

Next, we will describe detail of the second feed line 203. In the description, we pick up one of the second feed lines 203 to explain. Other second feed lines 203 are same as the description.

As shown in FIG. 3, the second feed line 203 includes an one end portion 203A, an other end portion 203B and a line portion 203C. The one end portion 203A has the first mode transformer 201. The other end portion 203B has the second mode transformer 202. The line portion 203C connects the one end portion 203A with the other end portion 203B. Width "b" of the other end portion 203B is wider than width "a" of the one end portion 203A (a<b). A bend angle θ (0≦θ<90) is an angle between a central axis X3 and a central axis X4. The central axis X3 is center of the one end portion 203A and divides the width "a" in half. The central axis X4 is center of the line portion 203C. The central axis X3 is parallel to the first feed line 104. On the other hand, the central axis X4 is not parallel to the first feed line 104 and the line portion 203C is slope to the first feed line 104.

The central axis X4 slopes to the central axis X3. Therefore, the first mode transformer 201 and the second mode transformer 202 are arranged out of alignment. As a result, the first mode transformer 201 and the second mode transformer 202 can feed to the subarray antenna 102 with small area.

Figure 4:
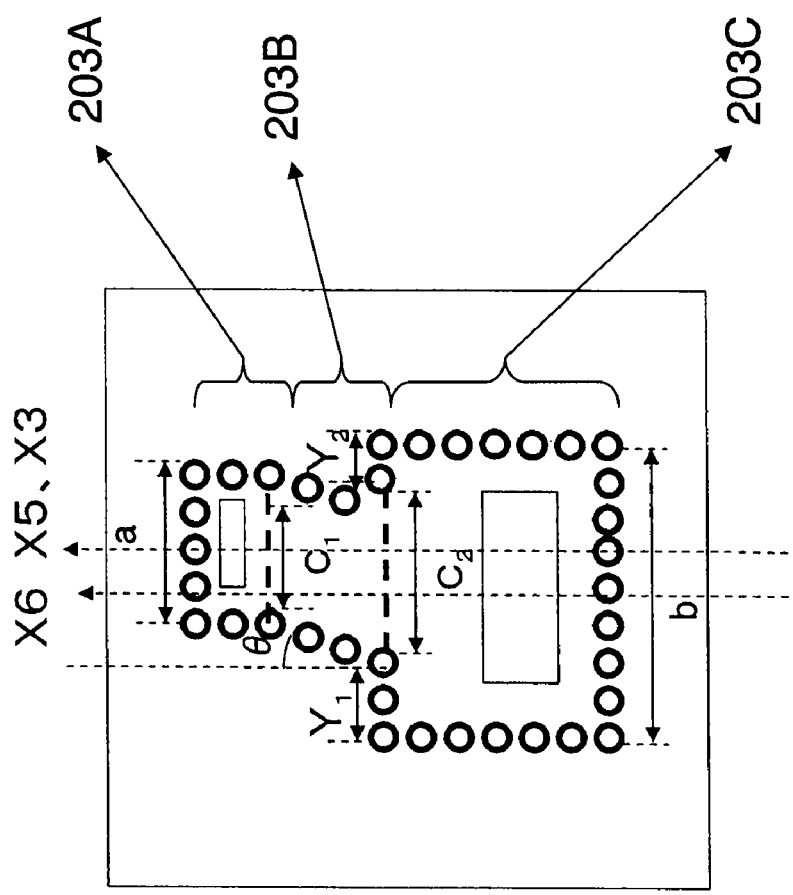
FIG. 4 is a top view of a second feed line.

As shown in FIG. 4, a central axis X5 is center of the one end portion 203A. A central axis X6 is center of the other end portion 203B. The other end portion 203B is arranged as that the central axis X6 is parallel to the central axis X5. A first side Y1 and a second side Y2 are sides of the other end portion 203B and attached to the line portion 203C. The first side Y1 is longer than the second side Y2.

Figure 6:
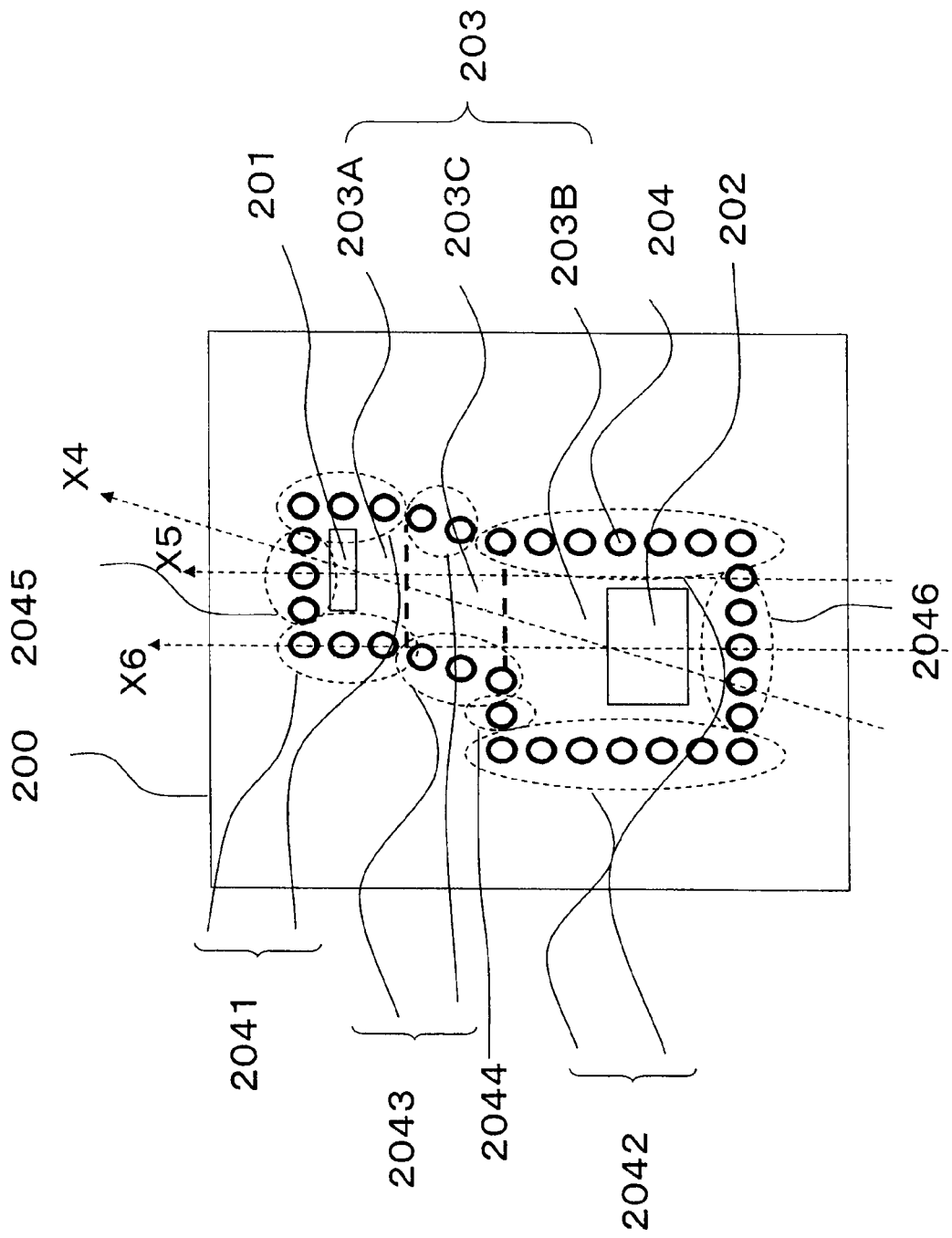
FIG. 6 is a top view of a second feed line.

As shown in FIG. 6, length of the second side Y2 may be "0". This means that only the first side Y1 exists. In this case, a corner of the line portion 203C and a corner of the other end portion 203B are smoothly continuing. The corner of the other end portion 203B is closer to the one end portion 203A than any other corners of the other end portion 203B.

Figure 5:
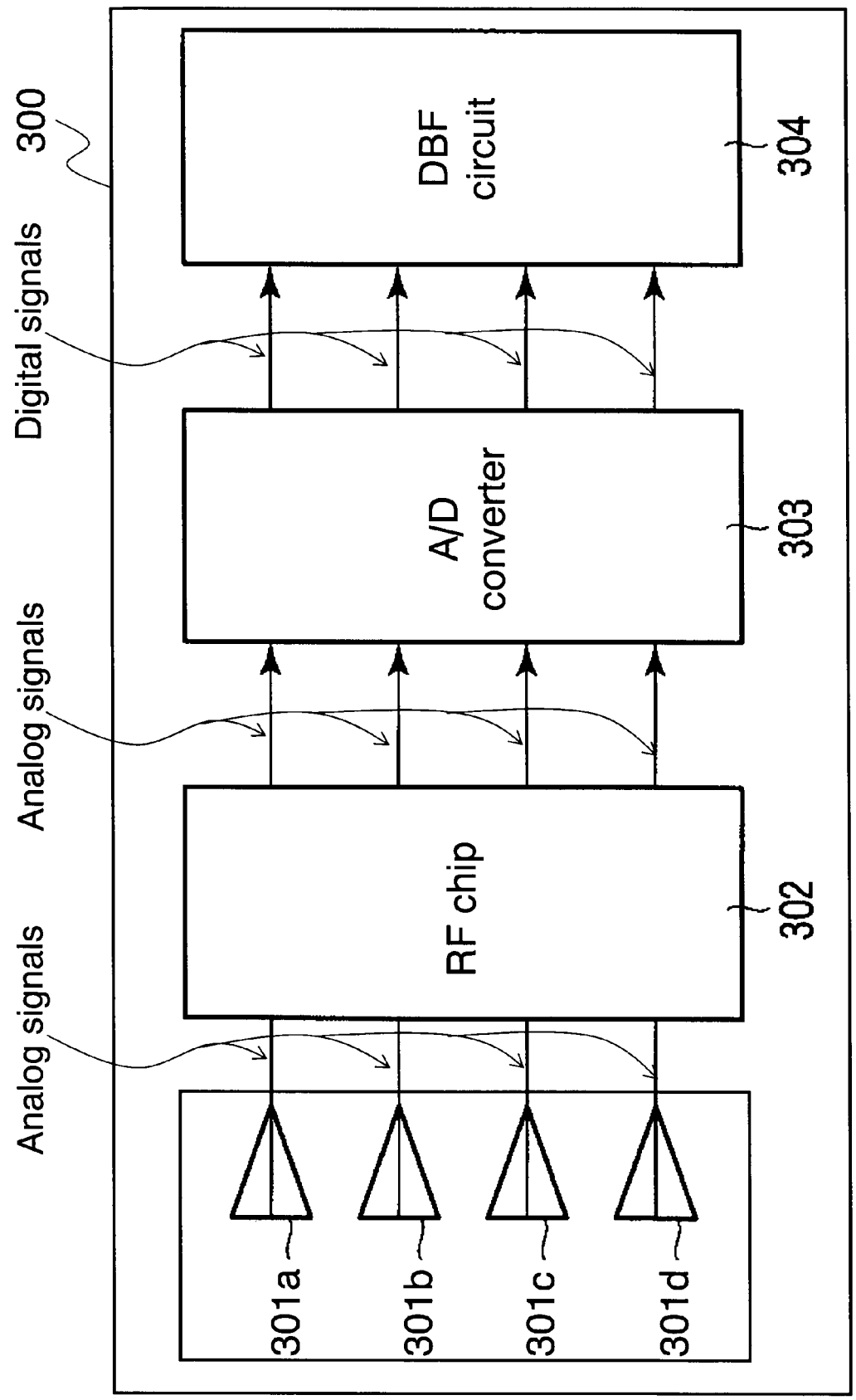
FIG. 5 is a block diagram showing a radar apparatus.

Hereinafter, we will explain a monopulse radar system. As shown in FIG. 5, the monopulse radar system 300 includes the antenna device, an RF module 302, an A/D (Analog/Digital) converter 303, and a DBF (Digital Beam Forming) circuit 304. The antenna device includes the subarray antennas 301a, 301b, 301c, 301d.

Each subarray antenna 301 receives an analog signal. The antenna device outputs the analog signals from the subarray antennas 301a, 301b, 301c, 301d to the RF module 302. The RF module 302 amplifies the analog signals. Also, the RF module 302 down-converts a frequency of each analog signal to a lower frequency. Then, the RF module 302 outputs the analog signals to the A/D converter 303. The A/D converter 303 converts the analog signals to digital signals. Then, the A/D converter 303 outputs the digital signals to the DBF circuit 304. The DBF circuit 304 measures the target angle by using the digital signals. Explain of the detail to measure the target angle is skipped because it is same as conventional methods.

(Example of the Second Feed Line 203)

As shown in FIG. 6, each second feed line 203 is surround by the through holes 204.

The through holes 204 provide a first through holes line 2041, a second through holes line 2042, a third through holes line 2043, a first through holes group 2044, a second through holes group 2045 and a third through holes group 2046.

The first through holes line 2041 includes two lines of through holes which are set parallel to the central axis X5 of the one end portion 203A. The one end portion 203A exists between the two lines of through holes of first through holes line 2041.

The second through holes line 2042 includes two lines of through holes which are set parallel to the central axis X6 of the other end portion 203B. The other end portion 203B exists between the two lines of through holes of the second through holes line 2042.

The third through holes line 2043 includes two lines of through holes which are set parallel to the central axis X4 of the line portion 203C. The line portion 203C exists between the two lines of through holes of the third through holes line 2043.

Width of the second through holes line 2042 is wider than the first through holes line 2041. Therefore, the central axis X5 of the first through holes line 2041 and the central axis X6 of the second through holes line 2042 are different.

The first through holes group 2044 connects the first through holes line 2041 with the third through holes line 2043.

The second through holes group 2045 connects the two lines of through holes of the first through holes line 2041. One ends of the two lines of the first through holes line 2041 are connected to the second through holes group 2045. Other ends of the two lines of the first through holes line 2041 are connected to the third through holes line 2043.

The third through holes group 2046 connects the two lines of through holes of the second through holes line 2042. One ends of the two lines of the second through holes line 2042 are connected to the third through holes group 2046. Other end of one of the two lines of the second through holes line 2042 is connected to the first through holes group 2044. Other end of other one of the two lines of the second through holes line 2042 is connected to the third through holes line 2043.

The end portion 203A, the other portion 203B and the line portion 203C may be formed as one structure to provide the second feed line 203.

Next, an example of array antenna 101 is described with reference to FIG. 7. In the example, the array antenna 101 is provided by post-wall waveguide slotted subarray antennas. The antenna substrate 100 is made of a dielectric substrate. Both top and under surfaces of the dielectric substrate are covered by metal foils. The first feed line 104 is a portion surrounded by through holes 106. The through hole 601 is through the antenna substrate 100. The through hole 106 shorts between the metal foils of the top and under surfaces of the dielectric substrate. Each post-wall waveguide is provided by alignment of the through holes 106. The adjacent post-wall waveguides share one alignment of the through holes 106 corresponding to a narrow wall of waveguide. The antenna element 103 is formed by opening a slot by etching. The post-wall waveguide slotted subarray antenna acts as a slot array antenna of a waveguide which is filled with dielectric material. Each slot may be formed parallel to an axis of the waveguide. The axis of the waveguide is parallel to the alignment of the through holes 106. Or, each slot may be formed longitudinal or 45-degree to the axis of the waveguide. Moreover, the post-wall waveguide slotted subarray antenna may have the through holes inside of the post-wall waveguide.

The feeding interface 105 is formed by etching.

As described above, since the second feed line 203 is formed on the feed line substrate 200 which is different from the antenna substrate 100 in the antenna device, the second feed line 203 can connect the RF module 401 and the array antenna 101 with short distance. Therefore, the antenna device achieves small size.

Moreover, one ends of the second feed lines 203 (which are connected to the array antenna 101) are arranged parallel to each other. Other ends of the second feed lines 203 (which are connected to the RF module 401) are symmetrically arranged about the one ends arranged parallel to each other. Specifically, the other ends are alternately located at a furthest end of the second feed lines 203 from the other end of the adjacent second feed lines 203. Therefore, the second feed lines 203 are arranged in the small area. In general, size of the second mode transformer 202 is larger than that of the first mode transformer 201 because the feed interfaces of RF module 401 are hollow waveguides which are larger than waveguide filled dielectric. In the antenna device according to the embodiment, the second mode transformers 202 are alternately arranged at different sides of the first mode transformers 201. Therefore, the other ends of adjacent second feed lines 203 are not adjacent. As a result, line connecting the first mode transformer 201 in the one end and the second mode transformer 202 in the other end of the second feed lines 203 achieves shorter length compared with the case that the second mode transformers in the other ends are arranged parallel to each other.

Since the feeding interface 105 is arranged at a middle of the first feed line 104, distance from feed interface 105 to each antenna element 103 can be shorter than when the feeding interface 105 is arranged at a end of the first line 104. Therefore, errors in a traveling wave phase of the signals in the first feed line 105 due to manufacturing error are accumulated a little. As a result, beam tilt due to manufacturing error can be reduced. Moreover, since the antenna elements 103 are symmetrically arranged about the feeding interface 105, the antenna elements 103 cancel the beam tilt due to manufacturing error. Accordingly, the beam tilt is more reduced.

Since width of the other end portion 203B is wider than width of one end portion 203A, impedance of the second feed line 203 can be smaller. Therefore, width of the second mode transformer 202 formed in the other end portion 203B becomes wider.

Since the first side Y1 is longer than the second side Y2 in the second feed line 203, the bend angle of the second feed line 203 becomes smaller. As a result, bandwidth of the second feed line 203 becomes wider.

Modified Example 1

Figure 8A:
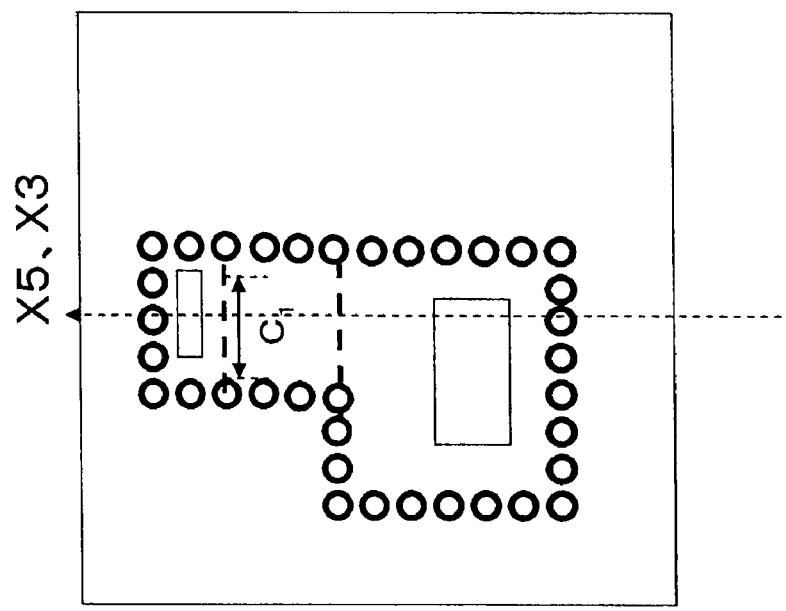
FIG. 8A is a top view of a second feed line.
Figure 8B:
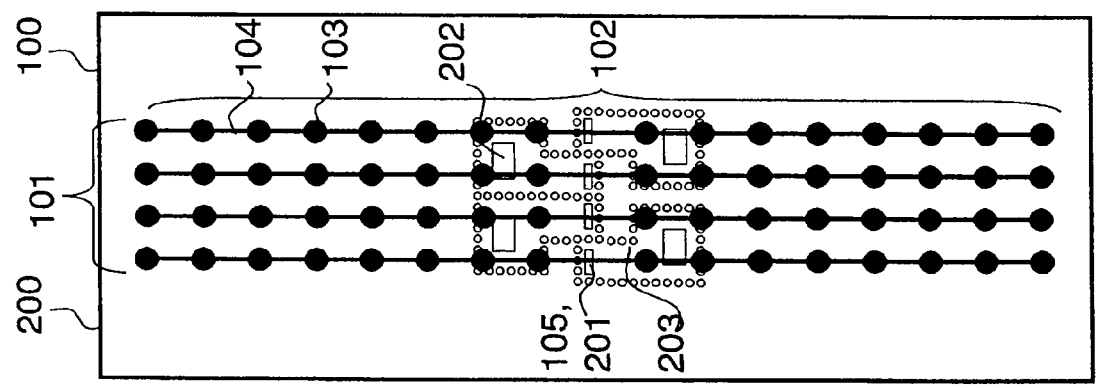
FIG. 8B is a top view of an antenna device.

In the above description, the central axis X4 of the line portion 203C is formed transverse to the central axis X3 of the subarray antenna 102. As shown in FIGS. 8A and 8B, the central axis X4 may be formed parallel to the central axis X3. In this case, the bend angle can be smaller. Therefore, bandwidth is achieved keeping wider.

Modified Example 2

Figure 9:
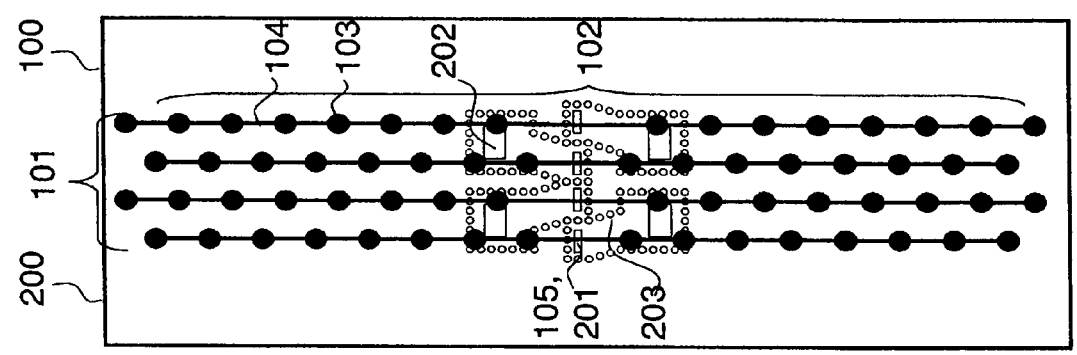
FIG. 9 is a top view of an antenna device.
Figure 10:
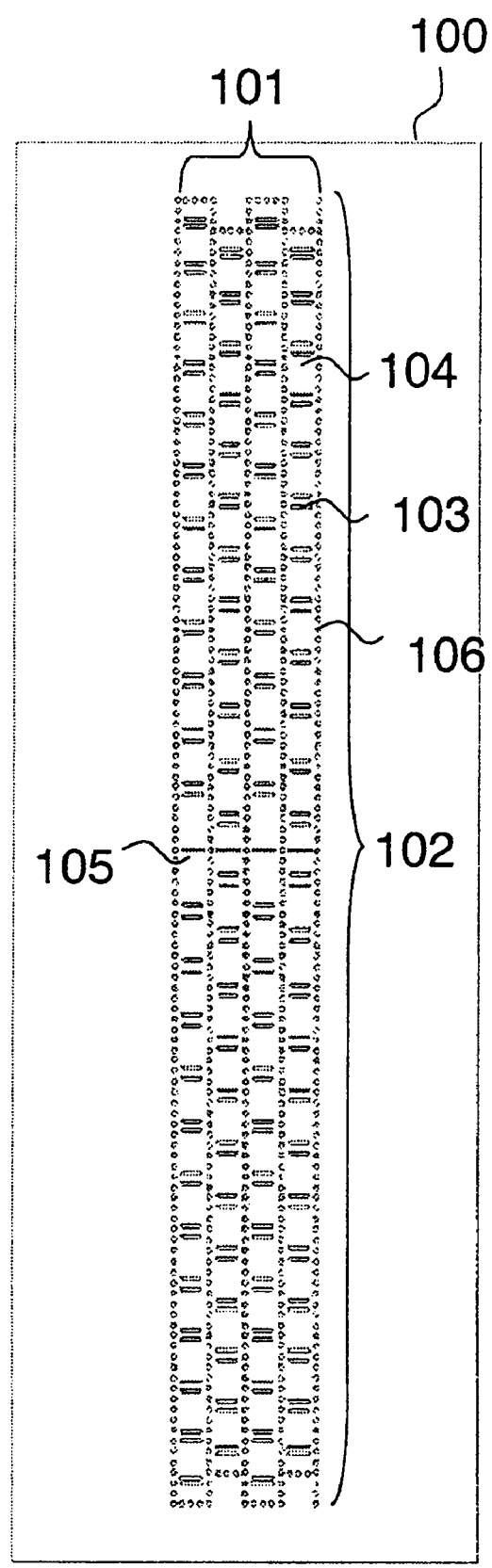
FIG. 10 is a top view of a prototype of an antenna device.

In the above description, the antenna elements 103 are arranged at same positions every subarray antenna 102. As shown in FIG. 9, the antenna elements 103 may be arranged at different positions every subarray antenna 102. In this case, phases of signals can be sifted in each subarray antenna 102. FIG. 10 shows a prototype of the antenna device using the post-wall waveguide slotted array antenna. The antenna elements 103 in FIG. 10 are arranged at different positions in the alternate subarray antennas 102 comparing to them in FIG. 7.

In the above description, the antenna device adopts the post-wall waveguide slotted array antenna. The antenna device may adopt a horn array antenna or a patch array antenna with a triplate line. In the case of the horn array antenna, the antenna device does not include the antenna substrate 100 but the horn array antenna acts as the antenna. The horn array antenna or the patch array antenna includes subarray antennas. The subarray antennas includes antenna elements, a first feed line which feeds to the antenna elements, and feeding interface which feeds signals to the first feed line. The feeding interface of the horn array antenna or the patch array antenna is formed on the same side on which the horn array antenna or the patch array antenna is formed.

Figure 7:
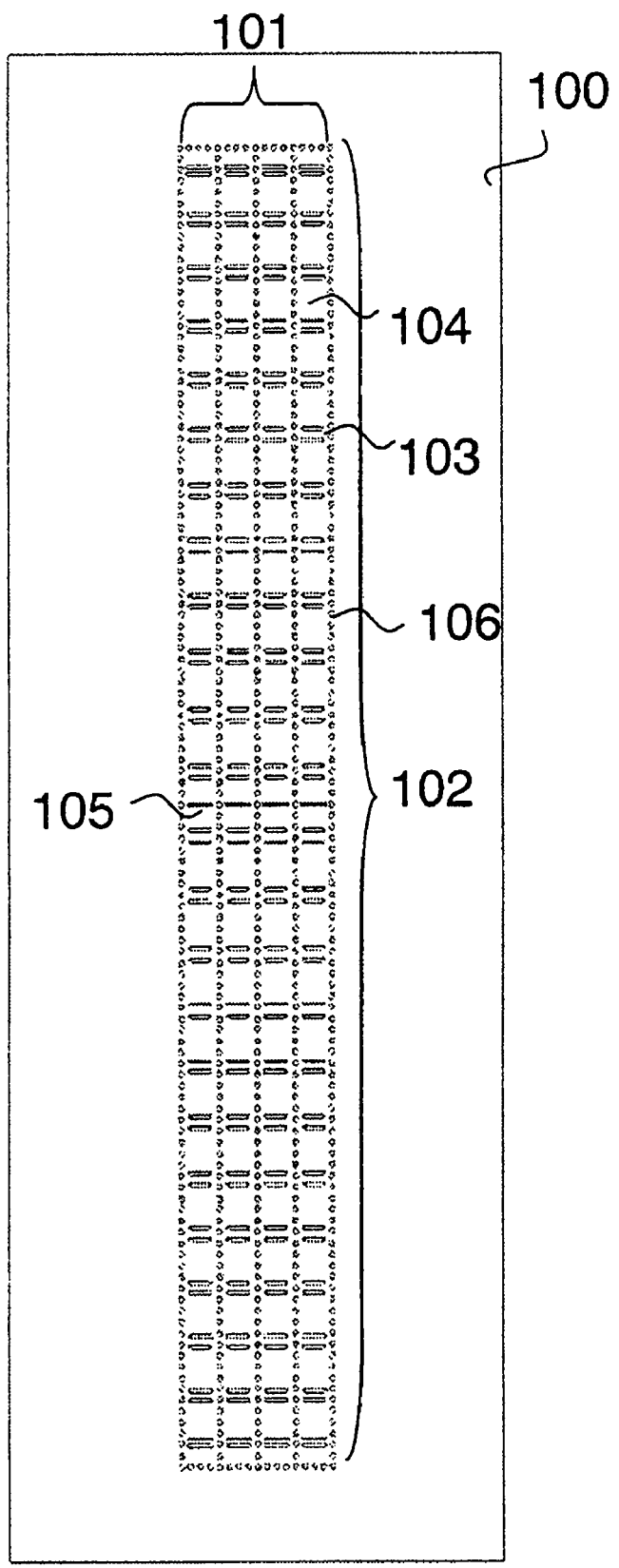
FIG. 7 is a top view of a prototype of an antenna device.

In the antenna device of FIG. 7, apertures of the first and second mode transformers are opened parallel to the antenna elements 103. The apertures of the first and second mode transformers may be opened longitudinal or transverse to the antenna elements 103. Each second feed line 203 may have several apertures of the first mode transformer and several apertures of the second mode transformer. Moreover, in the above description, each aperture has rectangle-shape. Each aperture may have hook-shape or cross-shape. The first and second mode transformers may include aperture and conductive pin.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An antenna device comprising:
   an antenna substrate having subarray antennas,
      arranged parallel to each other with an interval, the interval being less or equal than a free-space wavelength, each subarray antenna including antenna elements and first feed lines, the first feed lines feeding signals to the antenna elements,
      feeding interfaces, each feeding the signals to each of the first feed lines
      a back surface of the antenna substrate having the feeding interfaces;
      and
   a feed line substrate attached along the back surface, the feed line substrate including
      second feed lines, each having one end portion and other end portion, the other end portion having wider width than the one end portion, the one end portions are arranged in a line to each other with the interval, and the other end portions are alternately arranged across the one end portions,
      first mode transformers, each being located in the one end portion, each being connected to each of the feeding interfaces, and
      second mode transformers, each being located in the other end portion.

2. The antenna device of claim 1, wherein
   the second feed lines are symmetrically arranged about a first central axis, the first central axis is parallel to the second feed lines and divides the second feed lines in two groups.

3. The antenna device of claim 1, wherein
   the number of the second feed lines is even,
   two adjacent other end portions which are closest to a first central axis are arranged in same side against the corresponding one end portions,
   the first central axis is parallel to the second feed lines and divides the second feed lines in two groups.

4. The antenna device of claim 1, wherein
   each second feed line has a line portion connecting the one end portion and the other end portion,
   the other end portion has a first and second sides connected to the line portion, the first side is shorter than the second side.

5. The antenna device of claim 1, wherein
each second feed line has a line portion connecting the one end portion and the other end portion,
the other end portion has a corner connected to the line portion.

6. The antenna device of claim 1, wherein
each second feed line has a line portion connecting the one end portion and the other end portion,
the line portion has a second central axis, the second central axis is transverse to a first central axis,
the first central axis is parallel to the second feed lines and divides the second feed lines in two groups.

7. The antenna device of claim 1, wherein
each of the second feed lines is surrounded by through holes, each through hole is through the feed line substrate.

8. The antenna device of claim 1, wherein
a central axis of the other end portion is different from a central axis of the one end portion.

9. The antenna device of claim 1, wherein
the antenna elements are symmetrically arranged about a central axis on a top surface, the central axis divides the subarray antennas in two groups.

10. A radar apparatus comprising:
the antenna device of claim 1, which receives a first signal;
an RF chip amplifying the first signal and down-converting a frequency of the first signal to a lower frequency to obtain a second signal;
an A/D converter converting the second signal to a digital signal;
a DBF circuit measuring a target angle based on the digital signal.

* * * * *